United States Patent

Nothdurft

[11] 4,029,043
[45] June 14, 1977

[54] POSITION INDICATOR FOR VALVES AND THE LIKE

[75] Inventor: Jürgen Nothdurft, Behringersdorf, Germany

[73] Assignee: Klein, Schanzlin & Becker Aktiengesellschaft, Frankenthal, Germany

[22] Filed: Dec. 8, 1975

[21] Appl. No.: 638,891

[30] Foreign Application Priority Data

Dec. 10, 1974 Germany .......................... 2458279

[52] U.S. Cl. ............................ 116/125; 116/124 A; 116/124 R
[51] Int. Cl.² ........................................ F16K 37/00
[58] Field of Search .............. 116/125, 124 A, 123, 116/124 R; 137/551

[56] References Cited
UNITED STATES PATENTS

| 188,154 | 3/1877 | Leavitt | 116/125 |
| 385,274 | 6/1888 | Lammers | 116/125 |
| 3,845,736 | 11/1974 | Golbeck | 116/124 R |

Primary Examiner—S. Clement Swisher
Assistant Examiner—Denis E. Corr
Attorney, Agent, or Firm—Michael J. Striker

[57] ABSTRACT

A spindle is axially displaceable toward and away from an opening in a housing in which it is located. The spindle end portion facing the opening is concentrically surrounded by jaws having cam faces which are in permanent biased contact with the end portion or with a side member carried by the same. The jaws have surfaces which are located beneath and extend across the opening when the spindle is in one end position. As the spindle moves towards its other end position, the jaws are progressively deflected outwardly away from the spindle axis so that their surfaces, visible through the housing opening, also progressively recede transversely of the opening, thus providing a visual indication of the spindle position.

13 Claims, 3 Drawing Figures

U.S. Patent
June 14, 1977
4,029,043
FIG. 1
FIG. 2
FIG. 3
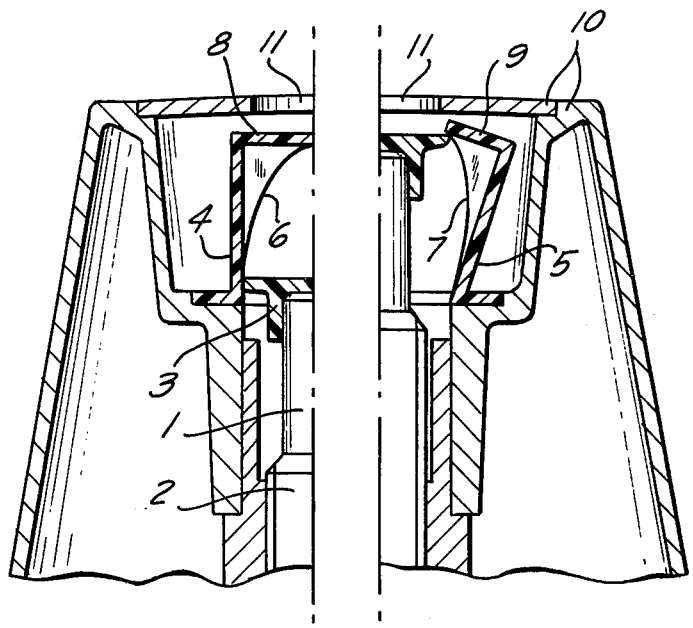
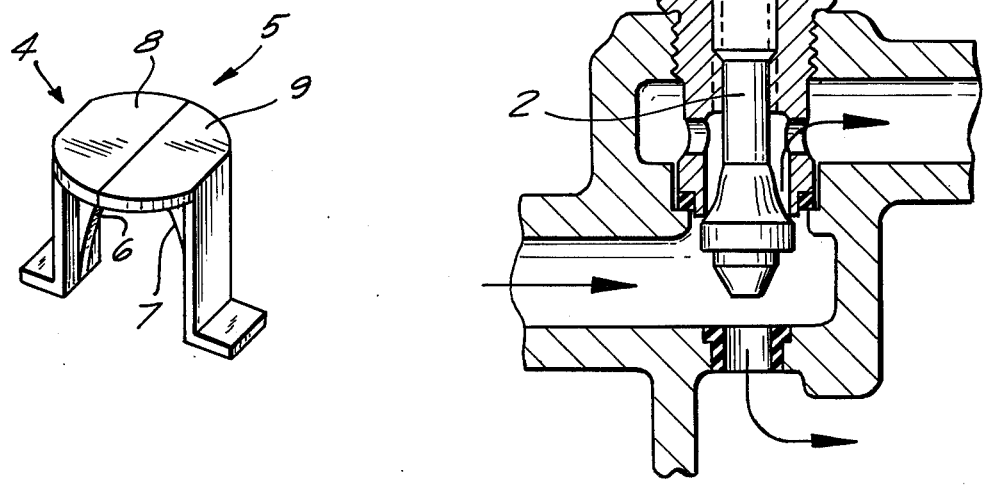

POSITION INDICATOR FOR VALVES AND THE LIKE

BACKGROUND OF THE INVENTION

This invention is concerned with a position indicator for valves and the like.

In valves, but also in other devices, it is often desirable — or even necessary — to be able to tell the position of a member, e.g. of a valve member. Several ways have been proposed in the art for doing this.

One proposal in German Pat. No. 805,477 suggests that a valve spindle, which moves axially in one direction or in an opposite direction as the valve is progressively opened or closed, carry a sleeve which is provided with markings and extends into a stationarily mounted ring. The position of the valve member which moves with the spindle is indicated in dependence upon the extent to which the ring covers the sleeve and the markings thereon. This arrangement provides an approximate indication of the valve member position, but it requires a mental conversion of the sleeve/ring indication into the actual valve member position. This requires considerable skill and the arrangement can therefore be used with any degree of reliability only by personnel having this skill and trained in the use of the arrangement.

German Pat. No. 646,316 teaches a different construction, wherein an indicating arrangement is provided in a handwheel for valves having a spindle which rises and descends in dependence upon the direction in which it is turned. A shaft is journalled in the housing, the latter being configurated as the handwheel. This shafts acts as a lever and is supported against a rod that is mounted outside the housing but extends movably into the same. The lever moves with the spindle and undergoes an angular displacement which is transmitted to an indicating arrangement via an angle drive. This construction is complicated and therefore subject to malfunction. Also, the rod extending to the outside of the housing can cause accidents.

Finally, another proposal suggests to use an end portion of the moving spindle itself to provide a positional indication. This proposal is not satisfactory for various reasons, including the fact that viewing must take place at an angle of 90° relative to the spindle axis, because otherwise the indications either cannot be seen at all or are so distorted that they transmit wrong information.

SUMMARY OF THE INVENTION

The present invention aims to provide a position indicator for valves and the like which avoids the aforementioned problems.

More especially, it is an object of the invention to provide such an indicator which is simple in construction.

Another object is to provide an indicator which, when used in a valve, indicates clearly the flow-through cross-section of the valve which is open at any given time.

A further object is to provide such an indicator which is highly accurate.

Still a further object is to provide an indicator of the type in question which can be accurately read even by persons who are semi-skilled or unskilled.

In keeping with these and other objects of the invention, one aspect of the invention resides in a position indicator for valves and the like which, briefly stated, comprises a combination of a housing having an opening, a member displaceable in a path substantially normal to the plane of the opening, and indicating means visually observable through the opening for indicating the displacement of the member, the indicating means comprising at least one jaw extending circumferentially of the member in elastically yieldable contact therewith, and cam means for yieldingly displacing the jaw relative to the member as a function of the movement of the member along the path.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a vertical section through an indicator according to the present invention, the left half of the Figure showing the indicator in the position which it assumes when an associated valve is closed, and the right half showing the position when the valve is open;

FIG. 2 is a perspective view, showing the jaws of the embodiment of FIG. 1; and

FIG. 3 is a fragmentary axial section showing a valve with which the indicator of the invention can be used to advantage.

DESCRIPTION OF THE PREFERRED EMBODIMENTS

In FIGS. 1 and 2, the valve and the valve member whose position is to be indicated, are not illustrated. However, an exemplary valve is shown in FIG. 3 which is self-explanatory and is therefore not believed to require any discussion.

Reference numeral 2 in FIGS. 1 and 2 identifies the valve spindle which moves axially and thus opens and closes the valve, e.g. the one of FIG. 3. Valve spindle 1 has an extension or end portion 1 on which there is mounted a slide portion 3 which may be of synthetic plastic material. A pair of jaws 4, 5 (shown in detail in FIG. 2) surrounds the slide portion 3; the jaws have respective cam faces 6, 7 which are in elastically yieldable contact with slide portion 3. The latter may be of one piece with portion 1, or it may be a separate element and mounted on portion 1. Jaws 4, 5 are either of elastically yieldable material, e.g. a suitable thermoplastic material, so that the inherent elasticity of the material maintains cam faces 6, 7 pressed against slide portion 3, or separate biasing means (e.g. one or more not illustrated springs) may be employed. Jaws 4, 5 have respective surfaces 8, 9. A housing 10 surrounds the arrangement and has an opening 11 which extends in a plane normal or substantially normal to the longitudinal axis (and hence the path of movement) of spindle 2.

When the valve is in fully closed position, the jaws 4, 5 are so located (shown at the left-hand side of FIG. 1 relative to the jaw 4) that the surfaces (here surface 8) extend beneath and entirely across the opening 11, thus being visually observable and indicating the fully closed valve position.

As the spindle 2 moves upwardly during progressively greater opening of the valve, the slide portion 3 moves with the spindle and, travelling along the cam faces 6, 7, presses the jaws 4, 5 laterally outwardly away from the spindle axis. The abutting edges of the surfaces 8, 9 therefore recede from one another and from a gap. The width of this gap corresponds to the free flow-through cross-section of the valve.

When the spindle has moved all the way up and the valve is fully open, the jaws 4, 5 have fully receded from the opening 11 and it is now the slide portion 3 which is alone visible through the opening 11.

It is advantageous if the colors of slide portion 3 and those of the jaws 4, 5 (or at least of the surfaces 8, 9) are selected to contrast strongly with one another. This reinforces the indication, especially in the intermediate spindle positions.

Should the arrangement be used in conjunction with a valve in which the fully open valve position is reached when the spindle is in its lowermost (rather than uppermost) position, it is merely necessary to arrange the cam faces 6, 7 in reverse, so that they push the jaws 4, 5 in apart when the slide portion 3 is in the lowermost position. Furthermore, by simply changing the shape of the cam faces 6, 7, the arrangement can be readily adapted to indicate either the respective free flowthrough cross-section, or the respective position of a closure member (which may be a valve cam, valve member or diaphragm) in relation to its stroke length, i.e. the length of its path of displacement.

The slide portion 3 could be omitted and cam faces 6, 7 could engage the end portion 1 directly. The use of slide portion 3 is advantageous if the space conditions do not permit direct contact of cam faces 6, 7 with end portion 1.

A single jaw (4 or 5) could be used, in which case its surface (8 or 9) would completely cover the opening 11 in the fully closed position and would progressively recede in transverse direction during movement to fully open position. The opening 11 may be provided with a tight glass, or it may be constructed to have a shape corresponding to the shape of the flow-through cross-section whose blocking or unblocking is to be indicated. This latter possibility affords an even clearer and more immediate tie-in between the indication and the flow-through cross-section.

The arrangement provides for a direct indication without any need for auxiliary markings. It does not require an observer to make mental conversions. Further, it is very simple and therefore extremely reliable, protected by the housing 10 and susceptible of being located in the immediate field of vision of persons who operate and/or supervise the valve or other equipment.

It will be understood that each of the elements described above, or two or more together, may also find a useful application in other types of constructions, differing from the types described above.

While the invention has been illustrated and described as embodied in a position indicator for a valve, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a valve, a combination comprising a valve housing having a fluid-flow passage and an opening spaced from said passage; means for changing the effective cross-section of said fluid-flow passage, including a portion movable relative to said passage; and indicating means visually observable through said opening for indicating the position of said portion relative to said passage and thereby the effective cross-section of said passage, said indicating means comprising a member displaceable in a path substantially normal to the plane of said opening as a function of the movement of said portion, at least one jaw extending at least partially about said member in elastically yieldable contact therewith, and cam means for yieldingly and steplessly displacing said jaw relative to said member to a plurality of intermediate positions and end positions as a function of the movement of said member along said path.

2. A combination as defined in claim 1, wherein said member is a valve spindle.

3. A combination as defined in claim 1, wherein said jaw is at least in part of elastically yieldable material so that said cam means is permanently urged into engagement with said member.

4. A combination as defined in claim 1; further comprising biasing means biasing said jaw into said contact with said member.

5. A combination as defined in claim 1, wherein said opening is provided with a sight glass.

6. In a valve, combination comprising a housing having an opening; a member of circular cross-section displaceable in a path substantially normal to the plane of said opening; and indicating means visually observable through said opening for indicating the displacement of said member, said indicating means comprising one jaw extending at least partially about said member in elastically yieldable contact therewith and another jaw which together with said one jaw concentrically surrounds said member, and cam means comprising at least one cam face on each of said jaws and in contact with said member for yieldingly and steplessly displacing said jaws relative to said member to a plurality of intermediate positions and end positions as a function of the movement of said member along said path.

7. A combination as defined in claim 6, wherein said member includes an end portion and a slide portion carried by said end portion and in said contact with said cam faces.

8. A combination as defined in claim 7, each of said jaws having a surface, said surfaces being located beneath said opening and extending across the same when said member is in one end position thereof, and said surfaces progressively receding transversely of said opening in response to movement of said member towards an opposite end position thereof.

9. In a valve, a combination comprising a housing having an opening; a member displaceable in a path substantially normal to the plane of said opening, said members including an end portion facing towards said opening and a slide portion carried by said end portion; and indicating means visually observable through said opening for indicating the displacement of said member, said indicating means comprising at least one jaw extending at least partially about said member in elastically yieldable contact with said slide portion, and cam means for yieldably displacing said jaw relative to said member as a function of the movement of said member along said path, said jaw having a surface which is located beneath said opening and extends across the same when said member is in an end position thereof, said surface progressively receding transversely of said opening to expose said slide portion in response to movement of said member towards an opposite end position thereof.

10. A combination as defined in claim 9, wherein said slide portion and said jaw are of thermoplastic material, the material of said jaw having a high elasticity.

11. A combination as defined in claim 9, wherein said slide member and at least said surface of said jaw are of different colors which contrast with one another.

12. In a valve, a combination comprising a housing having an opening; a spindle of circular cross-section displaceable in a path substantially normal to the plane of said opening; and indicating means visually observable through said opening for indicating the displacement of said spindle, said indicating means comprising at least one jaw extending concentrically to and at least partially about said spindle in elastically yieldable contact therewith, and cam means for yieldingly and steplessly displacing said jaw relative to said spindle to a plurality of intermediate positions and end positions as a function of the movement of said spindle along said path.

13. In a valve, a combination comprising a housing having an opening; a spindle of circular cross-section displaceable in a path substantially normal to the plane of said opening; and indicating means visually observable through said opening for indicating the displacement of said spindle, said indicating means comprising one jaw extending at least partially about said spindle in elastically yieldable contact therewith another jaw which together with said one jaw concentrically surrounds said spindle, and cam means for yieldingly and steplessly displacing said jaws relative to said spindle to a plurality of intermediate positions and end positions as a function of the movement of said spindle along said path.

* * * * *